US012642734B2

(12) United States Patent
Duquette

(10) Patent No.: US 12,642,734 B2
(45) Date of Patent: Jun. 2, 2026

(54) TWO-PART CANE SYSTEM

(71) Applicant: PLATINUM HEALTH, LLC, Orlando, FL (US)

(72) Inventor: Noel Duquette, Orlando, FL (US)

(73) Assignee: Platinum Health, LLC, Orlando, FL (US)

( * ) Notice: Subject to any disclaimer, the term of this patent is extended or adjusted under 35 U.S.C. 154(b) by 274 days.

(21) Appl. No.: 18/442,618

(22) Filed: Feb. 15, 2024

(65) Prior Publication Data

US 2024/0268530 A1 Aug. 15, 2024

Related U.S. Application Data

(60) Provisional application No. 63/485,065, filed on Feb. 15, 2023.

(51) Int. Cl.

| | |
|---|---|
| ***A61H 3/02*** | (2006.01) |
| ***A45B 9/00*** | (2006.01) |
| ***A45B 9/02*** | (2006.01) |
| ***A45B 9/04*** | (2006.01) |

(52) U.S. Cl.

CPC ............. *A61H 3/0244* (2013.01); *A45B 9/02* (2013.01); *A45B 9/04* (2013.01); *A45B 2009/007* (2013.01)

(58) Field of Classification Search

CPC .......... A61H 3/0244; A61H 2003/0255; A61H 2003/0261; A61H 2003/0272

See application file for complete search history.

(56) References Cited

U.S. PATENT DOCUMENTS

| | | | | |
|---|---|---|---|---|
| 4,850,564 A * | 7/1989 | Padin | E04H 12/2223 248/533 |
| 5,639,055 A * | 6/1997 | Fritz | A61H 3/0244 248/176.1 |
| 7,793,910 B2 * | 9/2010 | Salman | E01F 9/681 40/607.1 |
| D673,767 S * | 1/2013 | O'Donohue | D3/10 |
| 8,978,676 B2 * | 3/2015 | Williams | E04H 12/22 248/156 |
| 9,675,145 B2 * | 6/2017 | O'Donohue | A47G 25/12 |
| 11,619,063 B1 * | 4/2023 | Williams | E04H 12/2215 248/530 |
| 2003/0146362 A1 * | 8/2003 | Oetiker | A47G 25/12 248/346.03 |

FOREIGN PATENT DOCUMENTS

| | | | |
|---|---|---|---|
| DE | 19747631 A1 * | 9/1998 | A47G 25/12 |
| DE | 202005015557 U1 * | 1/2006 | A47G 25/12 |
| DE | 112016004516 T5 * | 6/2018 | B62B 9/147 |
| DE | 202019001836 U1 * | 6/2019 | A45B 7/00 |

* cited by examiner

*Primary Examiner* — David R Dunn
*Assistant Examiner* — Danielle Jackson
(74) *Attorney, Agent, or Firm* — McHale & Slavin, P.A.

(57) ABSTRACT

A cane system having an attachment end that is constructed and arranged to temporarily secure to a floor mounting plate. The floor mounting plate includes an attachment mechanism that allows the cane to be attached in an upright secure position, wherein the user can rely upon the cane to help stand up from a seated position. The attachment mechanism is further used to release the cane from the floor mounting plate, preferably by a foot operated lever. A spring-loaded T-handle is used for height adjustment of the cane, allowing ease of adjustment to accommodate a standing or sitting position.

9 Claims, 2 Drawing Sheets

TWO-PART CANE SYSTEM

PRIORITY CLAIM

In accordance with 37 C.F.R. 1.76, a claim of priority is included in an Application Data Sheet filed concurrently herewith. Accordingly, this application claims priority to U.S. Provisional Patent Application No. 63/485,065 entitled TWO-PART CANE SYSTEM, filed Feb. 15, 2023; the contents of which are incorporated herein by reference.

FIELD OF THE INVENTION

The field of the invention is devices used to assist in human stability and, in particular, to a cane system comprising a cane that can be secured to a floor mounting plate to provide a temporary support.

BACKROUND OF THE INVENTION

Minor physical disabilities can make it difficult to walk. For instance, as a person's age progresses, arthritis becomes common among the elderly, wherein pain and inflammation in the joints can make it difficult to walk. Aging can result in loss of muscle mass and strength, making it harder to maintain balance. Neurological conditions, such as Parkinson's disease, stroke or neuropathy, can further add to the above conditions. Even chronic conditions, such as heart disease, diabetes or respiratory problems, can make it difficult to walk without assistance due to fatigue and shortness of breath.

While these factors can interact with each other and make it increasingly difficult to walk, there are known devices to help maintain mobility and independence. Canes, used for thousands of years, are simple yet one of the most effective mobility aids that provide support for balance and stability. A walking cane can be used to provide support and stability for people who have difficulty walking by distributing weight and reducing stress on affected legs. A walker is another mobility aid that gives support to maintain balance or stability.

In many instances an individual may enjoy the simplicity of a cane but require the stability of a walker. For example, a cane is easier to maneuver than a walker while moving through an area having limited space; however, when the individual is stationary, the cane may provide little or no support. Even in the comfort of an individual's home, a walker must have sufficient room to maneuver around obstacles, such as furniture. This problem is not limited to homes; retirement homes, churches, synagogues, airports, and so forth all place the individual in a position to choose either the cane or the walker to assist in mobility. When an individual stops walking, the stability of a walker is superior to a cane if the individual has balance concerns. There are many circumstances, however, where a conventional walker fails to provide assistance, such as rising out of a seat.

For example, toilets are known to have a low seating position and if space is limited, can be difficult for a physically impaired individual to use. For this reason, bathrooms used by the public are required to have at least one handicap accessible facility. In many situations, an individual who may benefit from a handicap accessible bathroom cannot replicate the accessibility in a residential setting. The individual's home may not have the room for such accessibility devices. Further, the individual may not like the appearance of a handicap accessible bathroom, or cannot afford the modifications.

Thus, what is lacking in the industry is a system that has the simplicity of a cane for use in the ordinary and conventional manner, which adapts to a floor mounting plate to create a stationary stand.

SUMMARY OF THE INVENTION

Disclosed is a two-part cane system based upon a cane and a floor mounting plate. The cane is used in the ordinary and conventional manner but includes an attachment end that is constructed and arranged to secure to the floor mounting plate. The floor mounting plate is fastened wherever an individual would benefit from a rigid cane stand. The floor mounting plate includes an attachment mechanism that allows the cane to be temporarily attached in an upright secure position, wherein the user can rely upon the cane to help stand up from a seated position. The attachment mechanism is further used to release the cane from the plate, preferably by a foot operated lever. A spring-loaded T-handle is used for height adjustment of the cane, allowing ease of adjustment to accommodate a standing or sitting position.

An objective of the invention is to provide a two-part cane system wherein an individual may use a cane in the ordinary and conventional manner, and may temporarily attach the cane to a floor mounting plate for securing the cane in a rigid upright position.

Still another objective of the invention is to provide a floor mounting plate having a lever that is foot activated for attaching a cane to the plate and releasing the cane therefrom.

Yet another objective of the invention is to provide a cane attachment mechanism having a recessed ledge that can be formed integral to the cane, or attached to a conventional cane, for use in the temporary attachment to a floor mounting plate.

Still another objective of the invention is to designate approved spacing by placement of the floor mounting plates.

Other objectives and advantages of this invention will become apparent from the following description taken in conjunction with any accompanying drawings wherein are set forth, by way of illustration and example, certain embodiments of this invention.

DETAILED DESCRIPTION OF THE INVENTION

Figure 1:
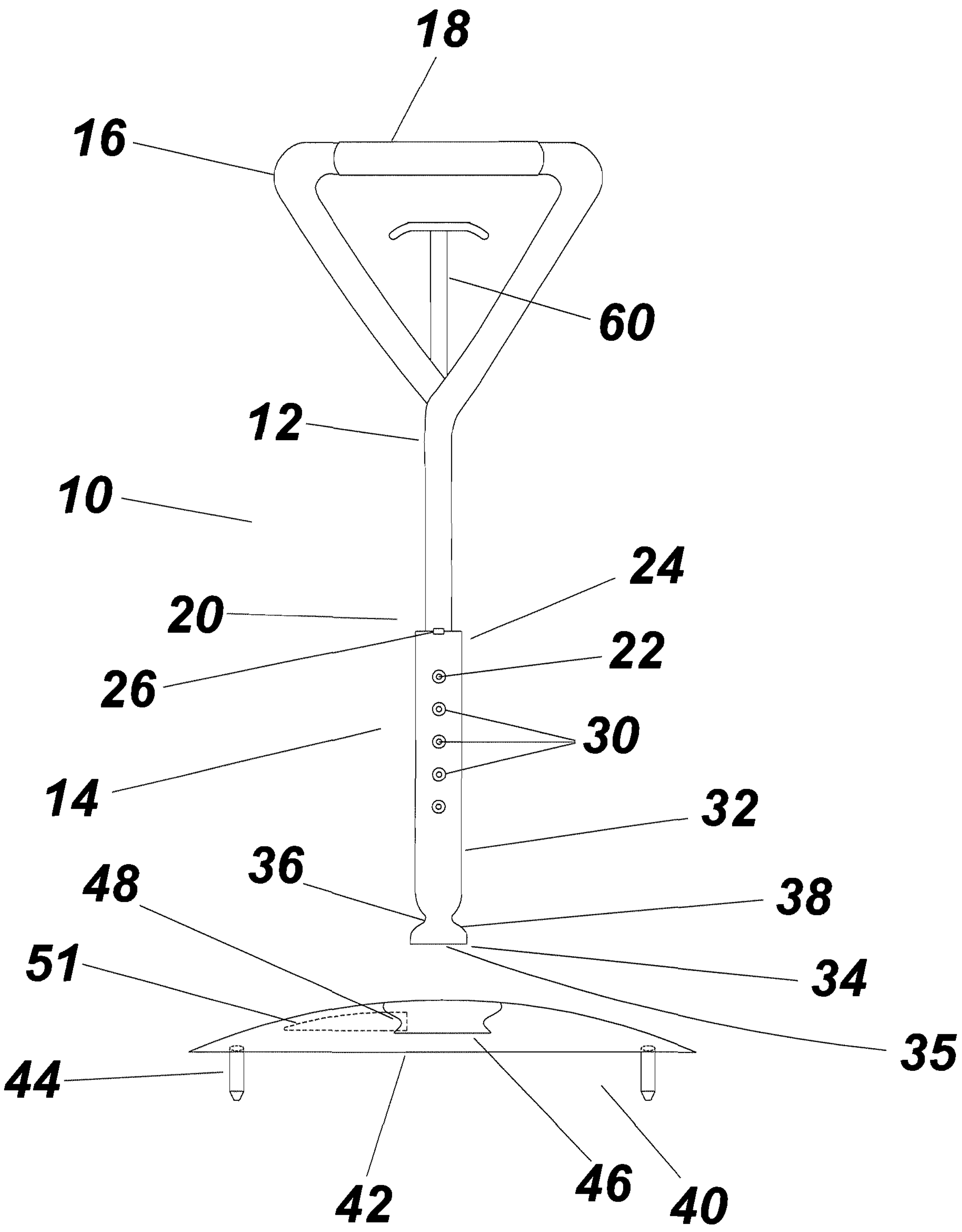
FIG. 1 is a front plane view of a cane spaced apart from a floor mounting plate.
Figure 2:
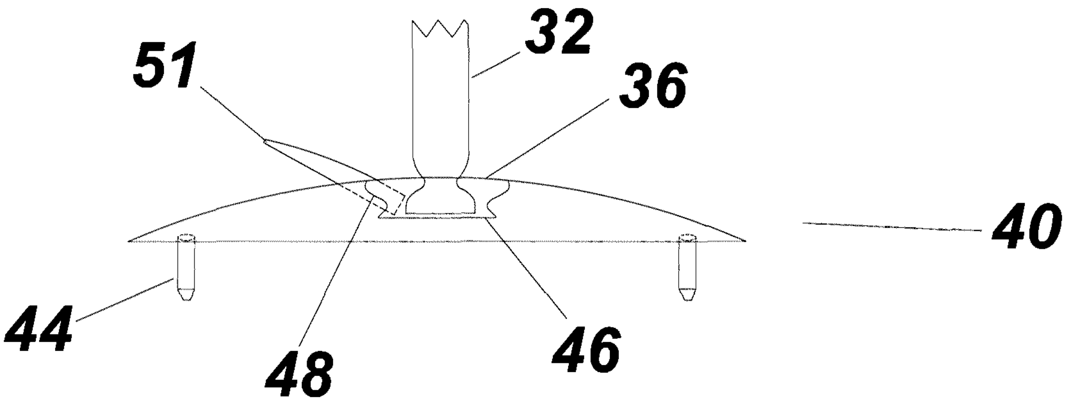
FIG. 2 is a side view of the floor mounting plate with a cane attached.
Figure 3:
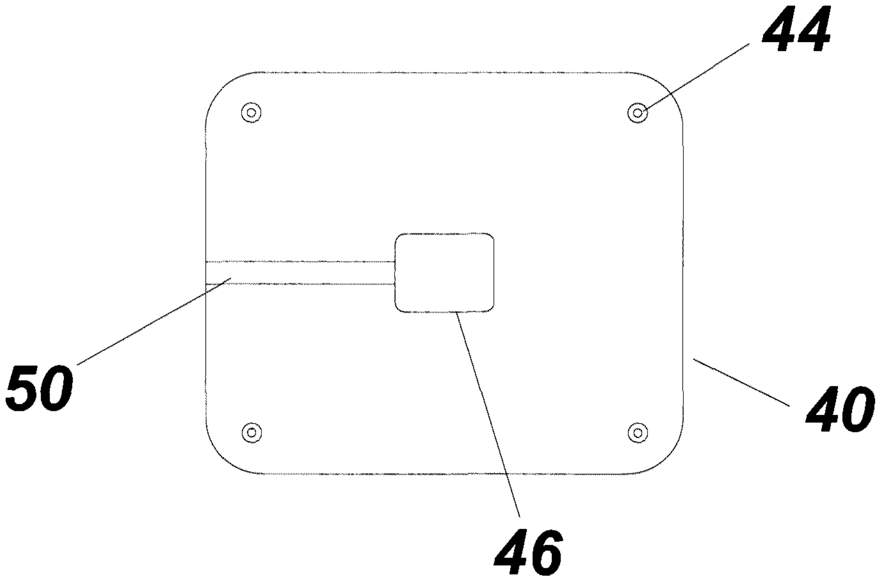
FIG. 3 is a top view of the floor mounting plate.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Disclosed is a two-part cane system comprising a cane and a floor mounting plate. The cane resembles a conventional cane except for an attachment end that is constructed and arranged to secure to the floor mounting plate. The cane itself is manufactured with a high strength material such as aluminum to prevent deflection when the side force is applied. The cane can be made from a variety of materials including steel, hardwoods such as ash, oak, or hickory, or carbon fiber; the attachment end offering the stability of metal, but with reduced weight, metal, or a combination thereof, including the use of a mounting tip shape fastened to the end of the cane. Alternative materials may be used wherein the attachment end is adapted to secure to the end of a pre-existing cane.

The floor mounting plate can be attached in multiple locations, as required by the user. In a home, floor mounting plates can be installed in locations such as the bathroom, bedroom, family room, living room, kitchen, and garage. In public, mounting plates may be placed in any location that would benefit from supporting visitors. Public waiting areas may include corridors known to have standing lines, such as check in counters, wherein an individual must stand in line while awaiting assistance. When a mounting plate is installed, a cane is used to engage the floor mounting plate, providing a rigid support that the standing individual can use for support.

Once the cane is engaged with the floor mounting plate, the cane is locked in position and can be used as a leverage point to help the elderly and physically challenged individuals steady themselves. When the floor mounting plate is placed adjacent an area with a seat, the locked cane can assist an individual to move themselves to and from a standing or sitting position. The floor mounting plate is a high strength, steel plate fastened to the floor with four lag bolts or the like fasteners. A receptacle in the center of the floor mounting plate is constructed and arranged to accept the bottom of the cane. The profile of the receptacle would match that of the cane. Preferably the profile is oval, rectangular, or square to prevent the cane from twisting in the receptacle when force is applied. A spring-loaded foot lever is built into the floor mounting plate to lock and unlock the cane as required. When the cane is not engaged in the floor mounting plate, the foot lever is flush with the surface of the mounting plate. Pushing the cane into the mounting plate activates the foot lever and moves it into a proud position, locking the cane securely in place. To disengage the cane from the mounting plate, the user steps on the spring-loaded foot lever to release the cane. The foot lever is then moved back into the flush position to prevent any tripping hazard. The shape of the mounting plate is similar to an upside down saucer plate, elevated in the center and tapering down to the floor on all sides to prevent tripping.

The cane is height adjustable to allow the user to set the height for maximum leverage when sitting or standing, and also when using as a standard walking device. A spring-loaded T-handle, just under the main grip, allows the user to adjust the height easily and quickly (much like a height adjustable handle on a typical suitcase with wheels). The body of the cane is a sliding tube-in-tube configuration.

Referring to the figures, the cane body 10 is defined by an upper section 12 and a lower section 14. The upper section 12 is further defined by a first end 16 having a shape that allows for comfortable use of the cane with a secure grip 18 for the user, and a second end 20 having a spring-loaded detent 22. The lower section 14 is defined by an upper end 24 forming a receptacle 26 for slidable receipt of the second end 20 of the upper section 12. The upper end 24 of the lower section 14 includes a plurality of detent openings or receptacles 30, allowing the user to adjust the height of the cane; the lower end 32 of the lower section 14 having a distal tip 34 for impacting a surface while a user is walking. An attachment mechanism 36 is formed from a recessed ledge 38 positioned along the lower end 32.

A floor mounting plate 40 is formed from a substantially flat plate 42 that is fastened to a floor using fasteners 44. Preferably, the fasteners 44 are threaded screws and/or adhesive to assure the floor mounting plate 40 remains stationary. The floor mounting plate 40 can be placed anywhere a stable cane stand is desired. The floor mounting plate 40 includes a centrally located receptacle 46 for temporary receipt of the distal tip 34 of the cane 10, and an attachment mechanism 48 for securing the cane 10 in a vertical position upon placement of the distal tip 34 into the receptacle 46; a release mechanism 50 is used to expel the distal tip 34 from the receptacle 46 when the rigidity of a fixed cane is not needed. The release mechanism 50 is spring-loaded with a foot lever 51 to disengage the distal tip 34 from the receptacle 46. The release mechanism 50 includes a lever extended outwardly from the floor mounting plate 40 when the cane 10 is inserted into the receptacle 46, and remains flush with said floor mounting plate 40 when the receptacle 46 is empty. The floor mounting plate can be used to designate approved spacing. For example, the floor mounting plates can be placed at 6 foot intervals in a line setting providing a dual function of a spacing designation and a cane support stand.

The distal tip 34 is constructed and arranged to provide stability and support when the cane 10 is subjected to side loads. Preferably, the distal tip 34 is not round in cross section so as to avoid spinning of the cane 10 while attached to the receptacle 46. The distal tip 34 includes a chamfered leading edge 35 for ease of placement within the floor mounting plate 40. In the preferred embodiment, the attachment mechanism 36 is formed integral to the cane body 10; alternatively, the attachment mechanism 36 can be secured to the cane body 10.

The detent receptacles 30 are positioned at intervals along the length of the cane 10, being operable to secure the telescoping sections 12, 14 in a desired position, allowing for adjustment of the cane's height. The cane system includes a spring-loaded T-handle 60 positioned beneath the upper section first end 16. The T-handle 60 is coupled to the spring-loaded detent 22, wherein the user can operate the spring-loaded detent 22 for purposes of adjusting the length of the cane 10.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cane system comprising:

a cane body having an upper section and a lower section; said upper section defined by a first end having a shape that allows for comfortable use of the cane with a secure grip for the user, and a second end having a spring-loaded detent; said lower section defined by an upper end forming a receptacle for slidable receipt of said second end of said upper section, said upper end including a plurality of detent openings allowing the user to adjust the height the cane, and a lower end having a distal tip for impacting a surface while an user is walking; a cane attachment mechanism formed from a recessed ledge positioned along said lower end of said lower section;

at least one floor mounting plate formed from a substantially flat plate that is fastened to a floor, said mounting plate having a receptacle for temporary receipt of said distal end of said cane, a floor mounting plate attachment mechanism for securing said cane in a vertical position upon placement of said distal tip into said receptacle, and a release mechanism to expel said distal tip from said receptacle.

2. The cane system according to claim 1 wherein said lower end of said cane is constructed and arranged to provide stability and support when the cane is subjected to side loads.

3. The cane system according to claim 1 wherein said detent receptacles are positioned at intervals along the length of the cane and operable to secure the telescoping sections in a desired position, thereby allowing for adjustment of the cane's height.

4. The cane system according to claim 1 including a spring-loaded T-handle positioned beneath the first end, said T-handle coupled to said spring-loaded detent wherein the user can operate the detent for purposes of adjusting the length of the cane.

5. The cane system according to claim 1 wherein said distal tip includes a chamfered leading edge for ease of placement within said floor mounting plate.

6. The cane system according to claim 1 wherein said cane attachment mechanism is formed integral to said cane body.

7. The cane system according to claim 1 wherein said floor mounting plate attachment mechanism is fastened to said cane body by a secure and durable means; said attachment mechanism providing reinforcement to said cane member to accommodate side loading.

8. The cane system according to claim 1 wherein said lower cane section has a non-round shape insertable into a corresponding receptacle to prevent rotation of said cane when attached to the floor mounting plate.

9. The cane system according to claim 1 wherein said release mechanism includes a lever extended outwardly from said floor mounting plate when the cane is inserted into the receptacle and remains flush with said floor mounting plate when the receptacle is empty.

* * * * *